United States Patent [19]

Matherat

[11] 4,286,264

[45] Aug. 25, 1981

[54] SIGNAL GENERATOR FOR A GRAPHIC CONSOLE

[75] Inventor: Philippe Matherat, Paris, France

[73] Assignee: Thomson-CSF, Paris, France

[21] Appl. No.: 39,261

[22] Filed: May 16, 1979

[30] Foreign Application Priority Data

May 18, 1978 [FR] France ................................ 78 14764

[51] Int. Cl.³ ................................................ G06F 3/14

[52] U.S. Cl. .................................... 340/744; 340/749; 340/790; 340/802

[58] Field of Search ............... 340/790, 715, 749, 744, 340/748, 750, 802

[56] References Cited

U.S. PATENT DOCUMENTS

| | | | |
|---|---|---|---|
| 3,396,377 | 8/1968 | Strout | 340/790 |
| 3,659,283 | 4/1972 | Ophir | 340/749 |
| 3,729,730 | 4/1973 | Sevilla et al. | 340/790 |
| 3,754,228 | 8/1973 | Hwang et al. | 340/749 |
| 3,911,420 | 10/1975 | Lampson | 340/749 |

*Primary Examiner*—Marshall M. Curtis
*Attorney, Agent, or Firm*—Roland Plottel

[57] ABSTRACT

A signal generator (20) for a graphic TV console equipped with an image memory (30); the generator generates a signal SYNC for synchronizing the TV scan, reading address signals for the image memory and timing signals for controlling an external graphic unit.

The generator includes a clock (21); a synchronous counter (22 and 23), logic means (24 and 25) enabling the signal SYNC and the luminance test signals to be generated, and a multiplexer (26) for multiplexing the read and write address signals associated with the image memory.

The invention may advantageously be used in information display systems, electronic games, etc.

10 Claims, 30 Drawing Figures

FIG_11a
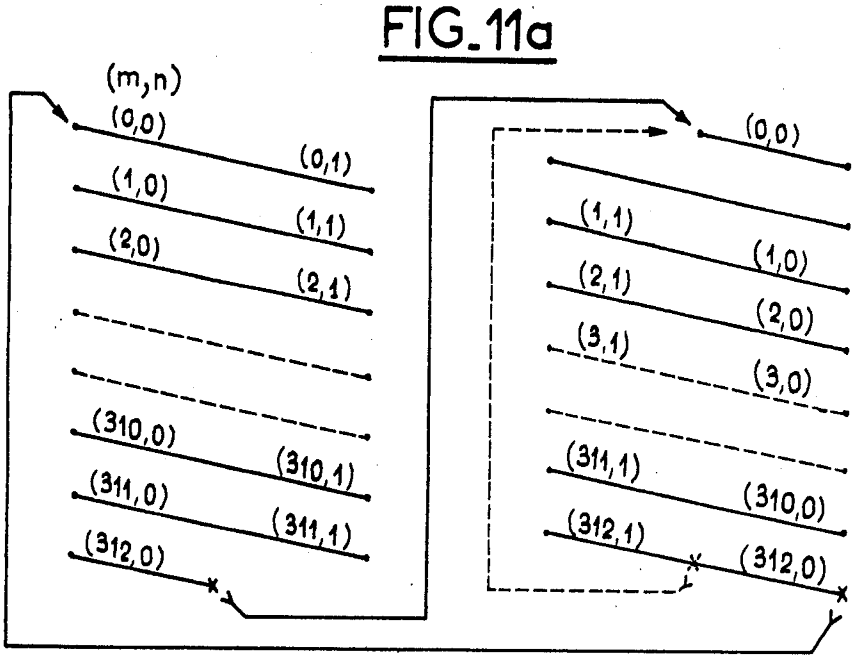
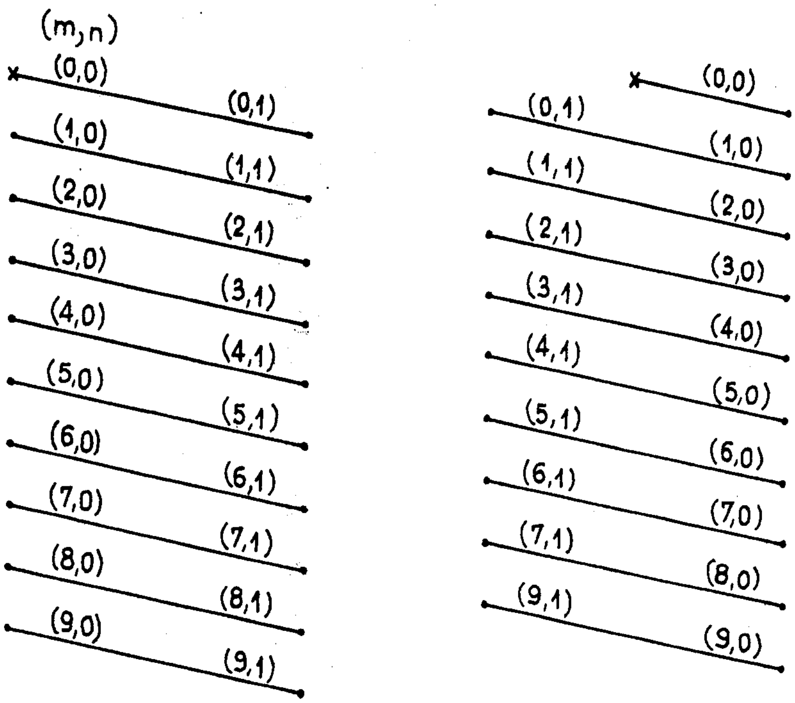
FIG_11b

SIGNAL GENERATOR FOR A GRAPHIC CONSOLE

This invention relates to the technical field of graphic terminals. More precisely, the invention relates to a graphic console having a CRT screen of the raster scan type and, more particularly, to a signal generator for a graphic console.

Information displaying systems which enable graphic images consisting of geometric figures and various symbols to be displayed on the screen of a graphic console are generically known in the art as graphic terminals. The invention is concerned solely with consoles in which the screen is formed by a cathode ray tube (CRT). CRT display consoles may be divided into two classes, according to how the screen is scanned. A first class includes the so-called "random" scan consoles and a second class the raster-scan or, more commonly, television type (TV) scan consoles. The present invention is concerned more particularly with this second class of devices.

On account of the very low persistence of the cathode screen in a graphic TV console, the data relating to the image have to be stored in a memory unit and then read-out repetitively at a high rate in order to reduce the phenomemon of "flickering". Generally, this memory unit, or image memory, is a random-access memory in which the data are stored in the form of discrete binary data.

According to the prior art, a signal generator for a graphic TV console comprises two parts:

a first part which produces the synchronising (SYNC) signals and margin signals for the graphic image, a second part which produces address signals for the image memory and signals for controlling a graphic unit also known as a graphic function generator.

A signal generator is described in applicants' French Pat. No. EN 77.05254 for "a processor for an terminal display using a television receiver".

One of the disadvantages of conventional signal generators lies in the complexity of the circuits enabling the TV console to operate with interlaced scanning.

The object of the present invention is to obviate the above-mentioned disadvantages and, in particular, to provide a signal generator which requires a reduced number of medium-scale integrated (MSI) circuits and also to enable this signal generator to be produced in integrated form on a microchip of a semi-conductor substrate.

Graphic display consoles are known in the art, cf. for example P. MORVAN's book entitled "Images et Ordinateurs" published by Larousse, Paris, 1976.

The present invention relates to a signal generator of the digital type by which it is possible to synchronise the scanning of a TV set according to two formats, namely an interlaced format and a non-interlaced (paired) format.

The invention also relates to a signal generator which produces address signals for reading an image memory wherein the organisation enables the definition (number of dots) comprising the graphic image displayed to be modified.

The invention also relates to a signal generator which produces signals for controlling an external graphic unit also known in the literature as a graphic function generator.

The signal generator according to the invention comprises a synchronous counter controlled by a dot clock; this counter comprising means for positioning the graphic image within the TV image, means for directly generating the reading addresses for the image memory, means for modifying the format of the TV image, means for controlling multiplexers for the writing address signals supplied by an external graphic unit.

According to one aspect of the invention, the counter comprises two parts, namely a low frequency part or horizontal part of which the state is reset to zero at the beginning of each of the scanning lines forming the graphic image and a high frequency or vertical part of which the state is reset to zero at the beginning of a frame of the graphic image.

According to another aspect of the invention, the most significant bit (MSB) in the horizontal counter carries an item of information corresponding to the reading and writing periods associated with the image memory.

According to another aspect of the invention, the reading address signals enable an image memory formed by memory modules of the dynamic type which, as is well known, must be periodically refreshed.

According to another aspect of the invention, the counter produces a test signal enabling the "white" level of the image to be identified.

Other features and advantages afforded by the invention will become apparent from the following description in conjunction with the accompanying drawings which show, by way of non-limiting example, embodiments of a signal generator for a graphic console of the television type in which:

FIG. 1 is a block diagram illustrating the principal elements of a graphic console.

FIGS. 2*a*, 2*b*, and 2*c* are timing diagrams for the synchronising signals of the TV scan.

FIG. 3 shows the signal generator according to the invention in a synoptic form.

FIG. 4*a* shows the input/output signals of a memory module of the image memory.

FIG. 4*b* is the timing diagram for the signals of FIG. 4*a*.

FIG. 5 shows the various zones of the cathode screen of the console.

FIG. 6*a* shows the configuration of the horizontal counter in schematic form.

FIG. 6*b* is a timing diagram for the signals of FIG. 6*a*.

FIG. 7*a* diagrammatically illustrates the recognition circuits of the upper part of the horizontal counter.

FIG. 7*b* is a timing diagram for the signal of FIG. 7*a*.

FIG. 8*a* shows a preferred embodiment of the upper part of the horizontal counter.

FIG. 8*b* is a timing diagram for the signals of FIG. 8*a*.

FIG. 9 diagrammatically illustrates an 11-bit counter.

FIG. 10 diagrammatically illustrates the configuration of the vertical counter.

FIGS. 11*a* and 11*b* are timing diagrams of the TV lines.

FIGS. 12*a* and 12*b* show the organisation of an image memory in a "monochrome" application and in a "colour" application.

Figure 17A:
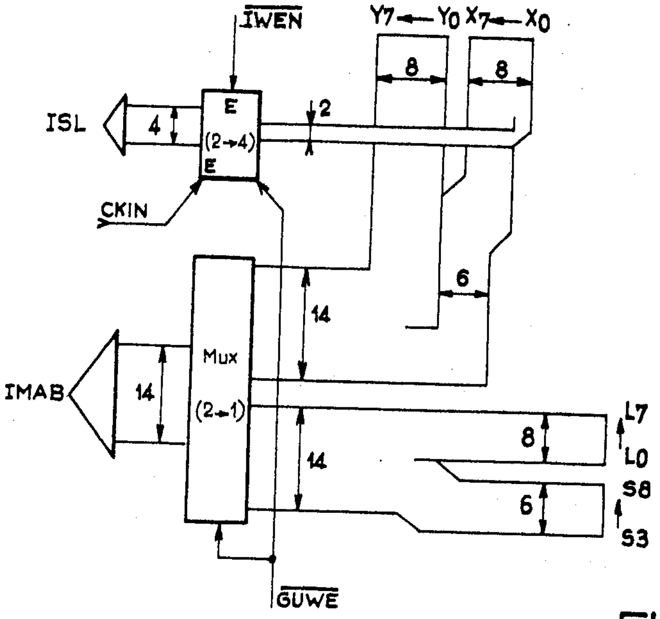
Figure 17B:
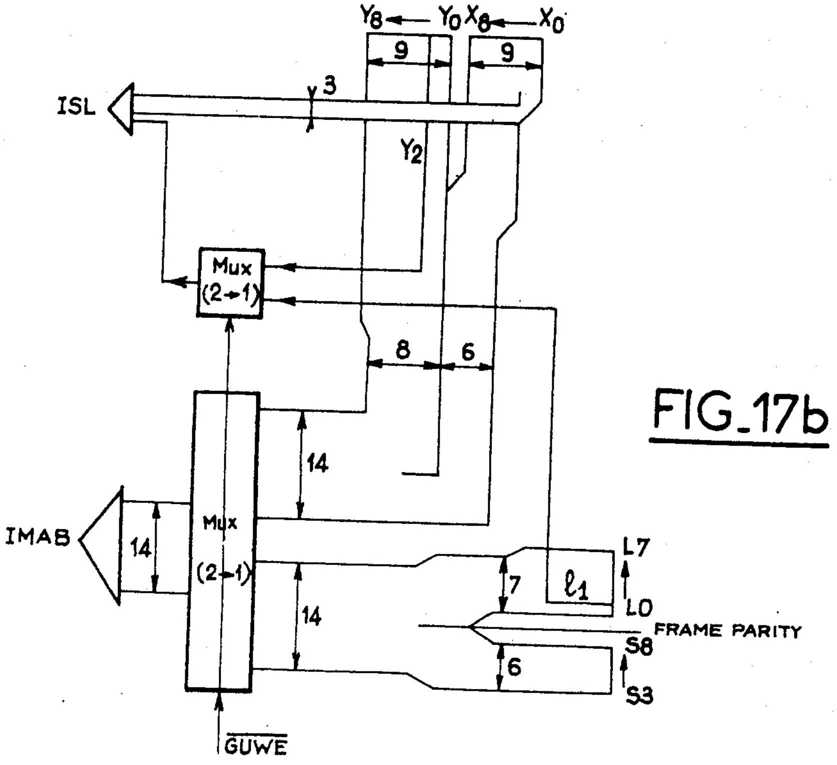
Figure 17C:
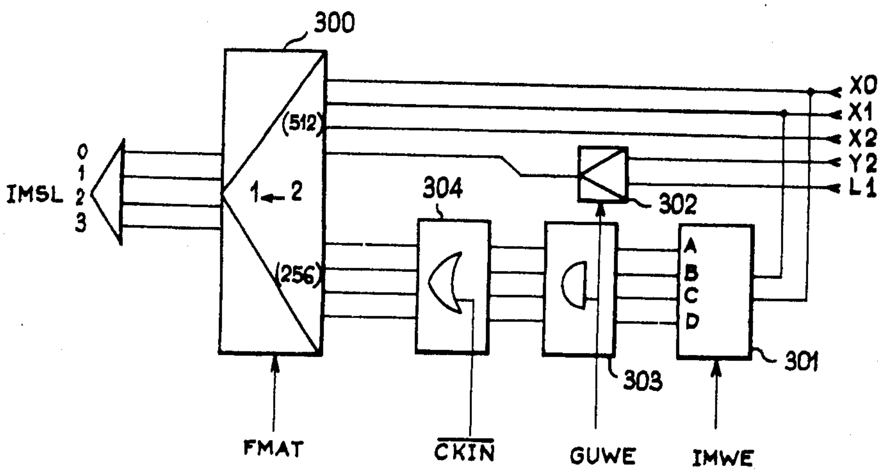

FIGS. 17*a*, 17*b*, and 17*c* show the configuration of the address signals as a function of the format of the TV image.

Figure 18:
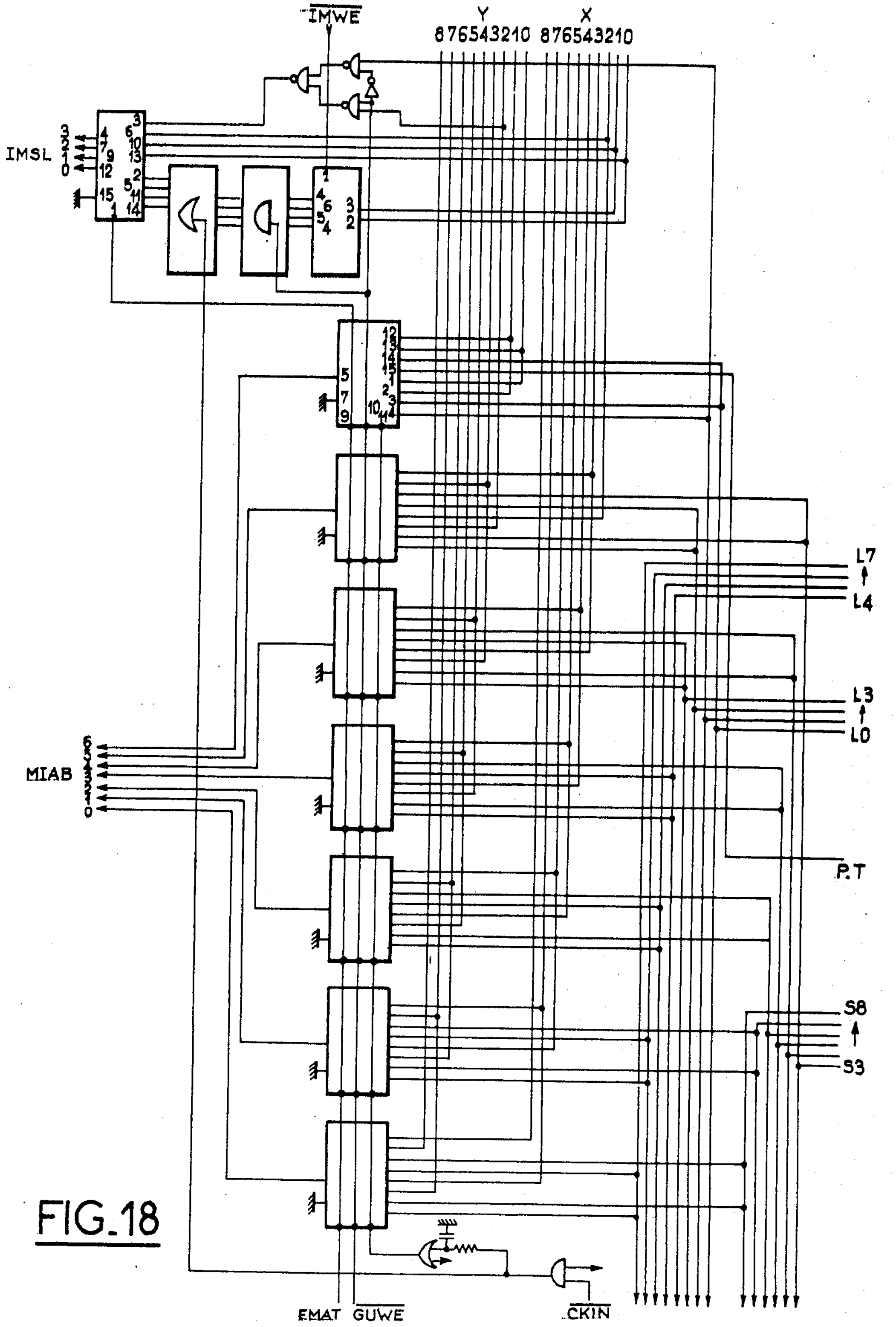

FIG. 18 shows an embodiment of the multiplexers for the address signals.

Figure 19:
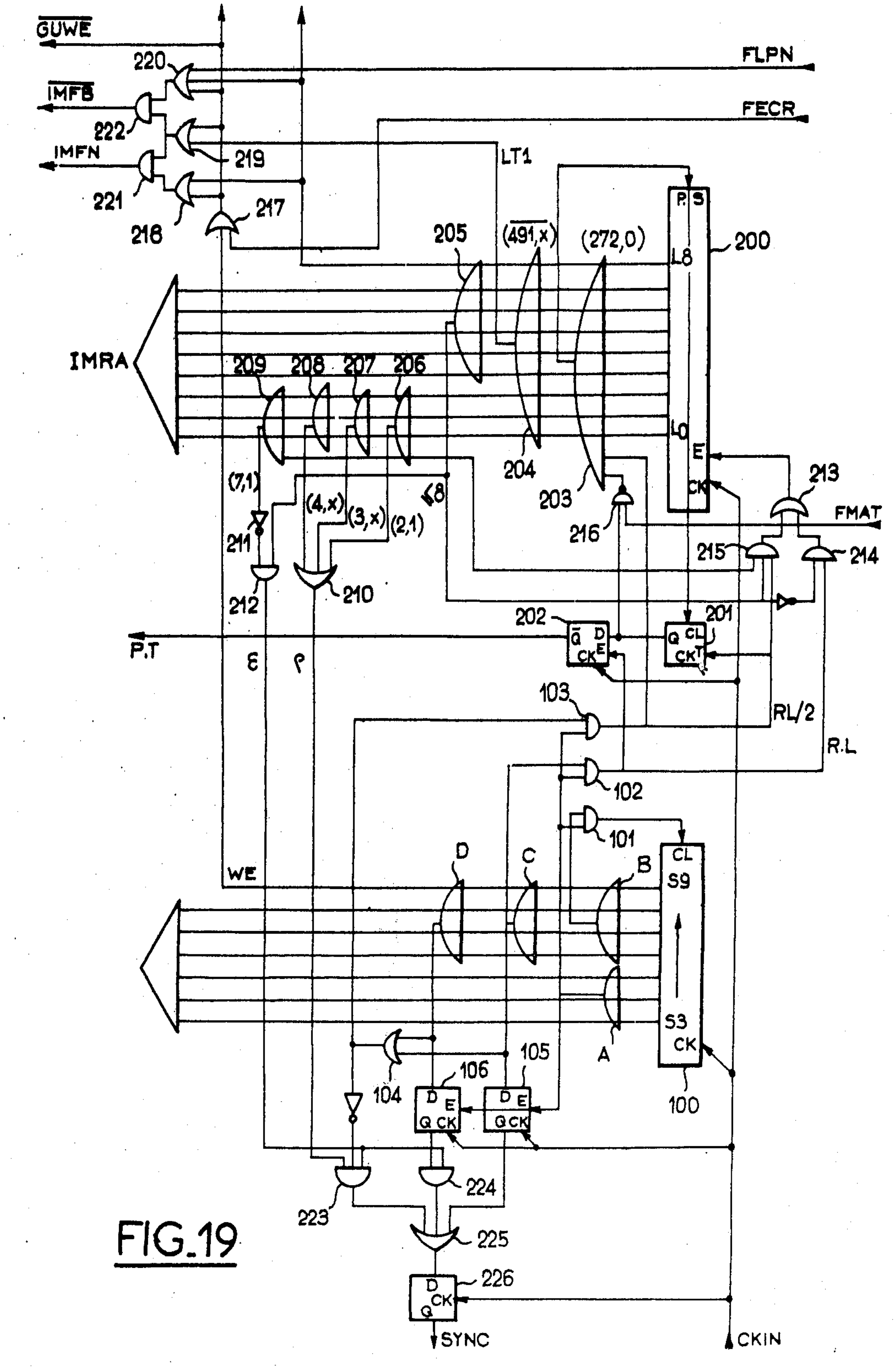

FIG. 19 shows the logic layout of the signal generator.

Figure 20:
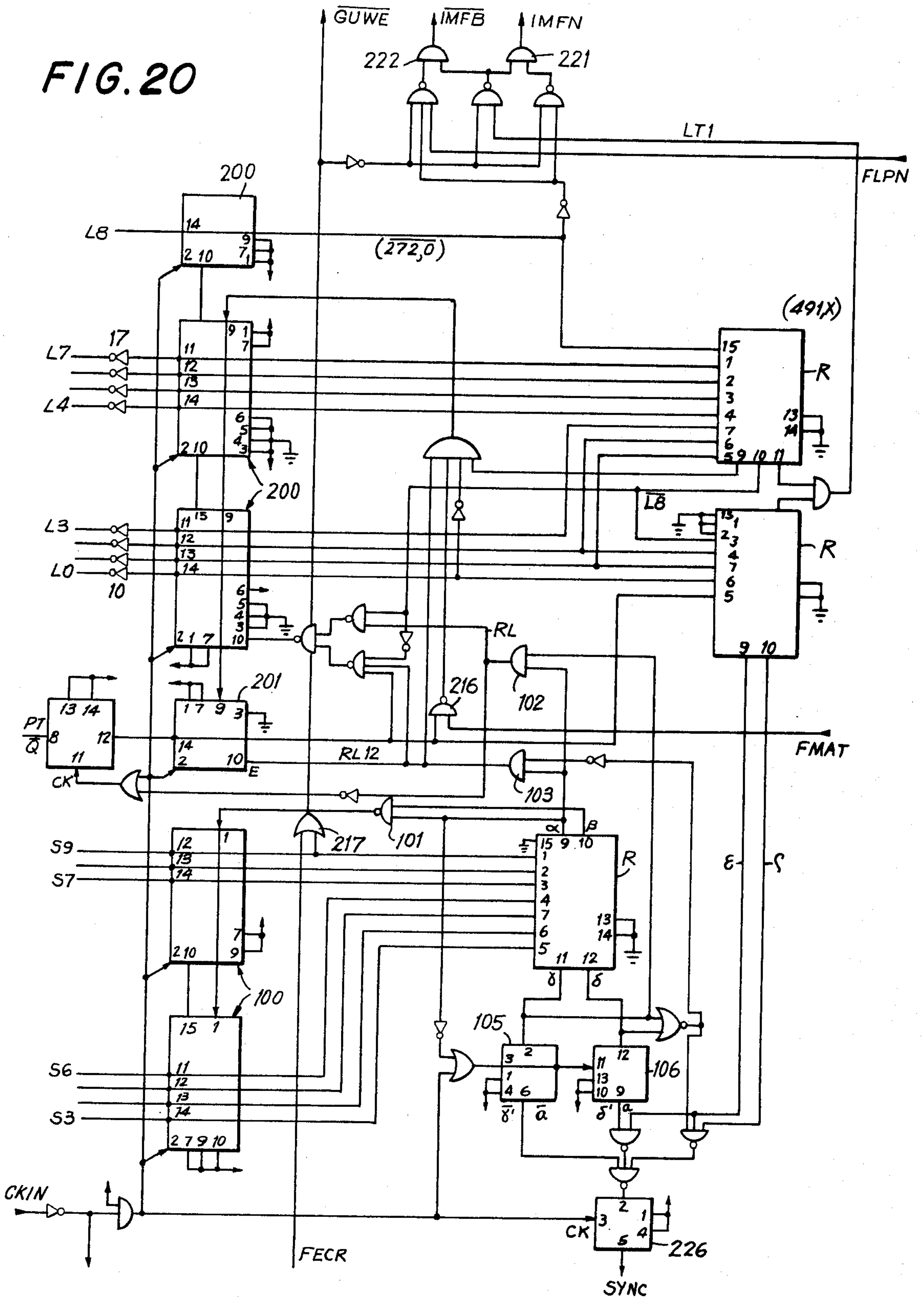

FIG. 20 shows an embodiment of the signal generator based on standard MSI and SSI circuits.

In the following description, certain specific details relating, in particular, to the construction of the clock circuit and the counters have not been described because these elements are known in the art, would complicate the description, and would obscure the novel features of the invention. Equally, however, it will be understood that numerous specific details have been included in the description in order to explain the new features of the invention and that they are not specifically necessary for carrying out the invention as described.

Figure 1:
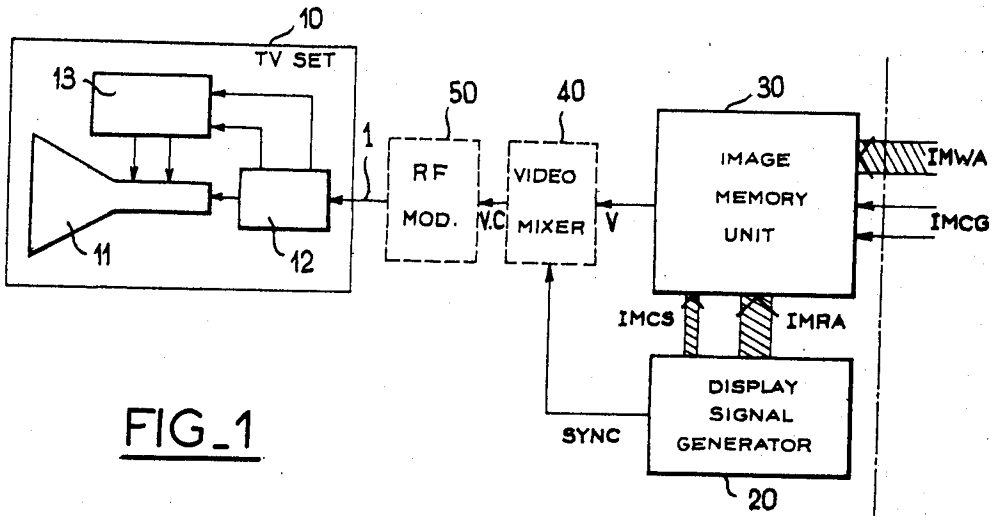

FIG. 1 shows in block diagram form the principal elements for forming a graphic display console. This console comprises the following elements:

a television set or TV set 10 which, at its input, receives a radio-frequency carrier wave (RF) modulated by a composite video signal (VC). This TV set comprises a cathode ray tube 11 (CRT) of the monochrome or colour type; an amplifier/demodulator 12 which delivers to the tube CRT a video signal for modulating the intensity of the electron beam and line and frame synchronising signals (SYNC) associated with a sweep circuit 13 of the cathodic screen;

an image memory unit 30 formed by memory modules (packages) of the RAM type (random-access memory) which may with advantage be of the dynamic type; this memory contains the data of the graphic image to be displayed; addressing signals IMWA and control signals IMCG supplied by a graphic unit (GRAPH) enable the data comprising the graphic image to be stored;

a display signal generator 20 which produces a synchronising signal SYNC for the scanning of the TV set, reading address signals IMRA and control signals IMCS associated with the image memory 30;

a video mixer 40 which mixes the video output signals V of the image memory and the signals SYNC produced by the generator 20 to form a composite video signal VC;

a radio frequency modulator 50 of which the carrier frequency is centered on the operating frequency of the TV channel selected.

The modulator 50 is an optional element and may be omitted if the TV set used is equipped with a direct video input. Similarly, the mixer 40 is an optional element which may be left out if the TV set used is equipped, on the one hand, with an separate video input and, on the other hand, with an SYNC input.

The other elements, such as the graphic unit GRAPH which enables the data comprising the image to be generated and stored in the image memory; the dialogue tools (light pen, control handle, joystick etc.), do not per se form part of the invention and are not described.

The display console which has just been described operates in two mutually exclusive modes, namely a writing mode in which the data comprising the graphic image are stored in the image memory and a reading-/display mode in which the data stored in the image memory are read and displayed on the cathode screen of the console. The reading and writing modes operate on a time-sharing basis whilst the reading mode operates repetitively at the raster rate of the TV frames. In addition, the graphic unit operates under the control of the signal generator 20.

The characteristics of the TV signals will first of all be recalled to mind in general form. The electron beam of the CRT tube continuously scans the entire visible surface of the screen in a format of, for example, the European CCIR standard 625 lines, 25 images per second in the interlaced frame mode and 312 lines, 50 images per second in the non-interlaced (paired) frame mode. Two types of signal are required to control a TV set, namely;

luminance signals comprising a video signal and a blanking signal; and synchronising signals comprising line tops and frame tops.

In the illustrative embodiment duration of the line synchronising tops is approximately 4.5 μs and their recurrence time H approximately 64 μs. The duration of the frame synchronising tops is equal to 2.5 H and their recurrence time is 20 ms.

Figure 2A:
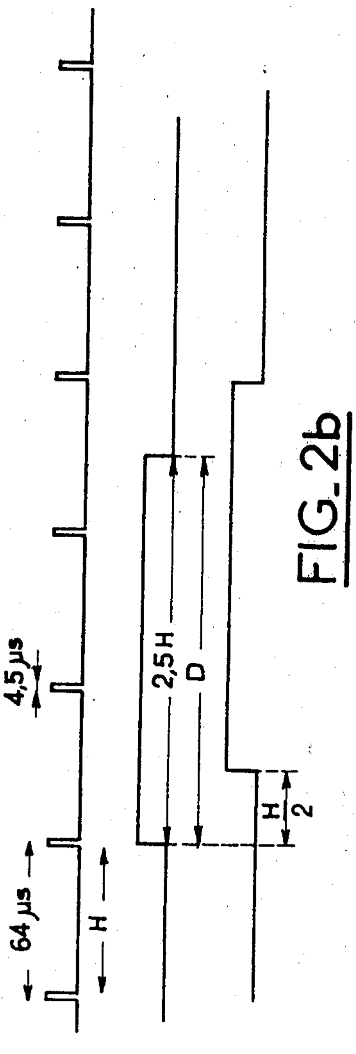
Figure 2B:
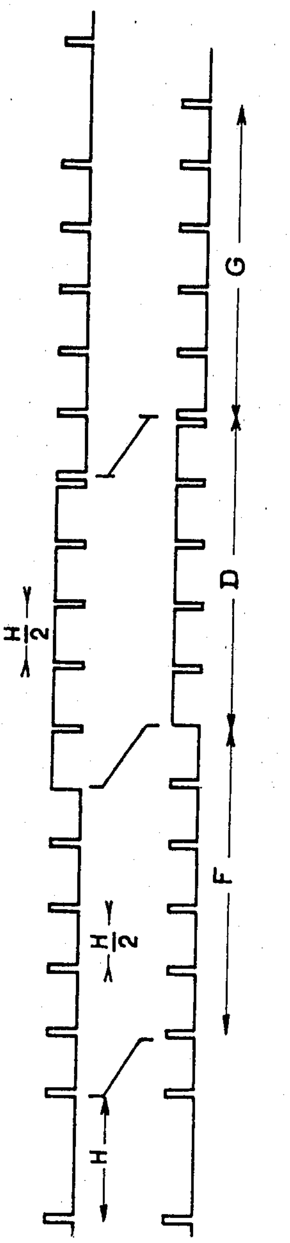

In order to obtain correct interlacing, one frame synchronising pulse out of two has to be in phase with a line synchronising pulse, whilst one frame synchronising pulse out of two has to begin at the middle of a line, as shown in FIG. 2*a*. The signal A corresponds to a so-called "even" frame. In order to correctly interlace the frames, it is necessary to modify the frame synchronising pulse shown in FIG. 2*a* and to produce signals corresponding to those illustrated in FIG. 2*b* which comprise a pre-equalising period F, a frame synchronising period D and a post-equalising period G. In addition, pulses of period H/2 have to be inserted during these periods in order to ensure correct operation of the line time base of the TV set.

Figure 2C:
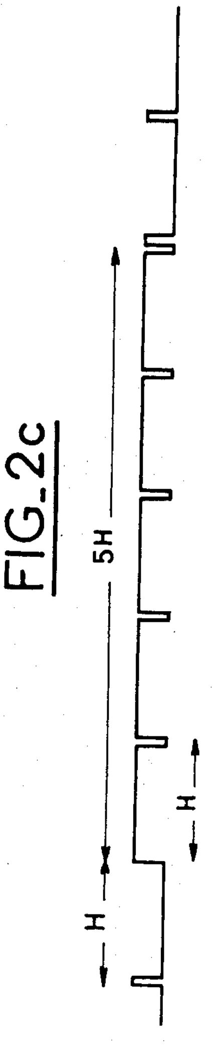

If it is desired to display a graphic image in which the vertical definition is less than 625 lines, it is, in the illustrative embodiment, preferable to form 50 identical frames each made up of 312 lines, i.e. to frame all the frame synchronising pulses in exactly the same way in relation to the line synchronising pulses. The synchronising signal may be simplified as shown in FIG. 2*c* although, in a multiformat system, it is possible to use one of the signals shown in FIG. 2*b*, as will be described hereinafter.

Figure 3:
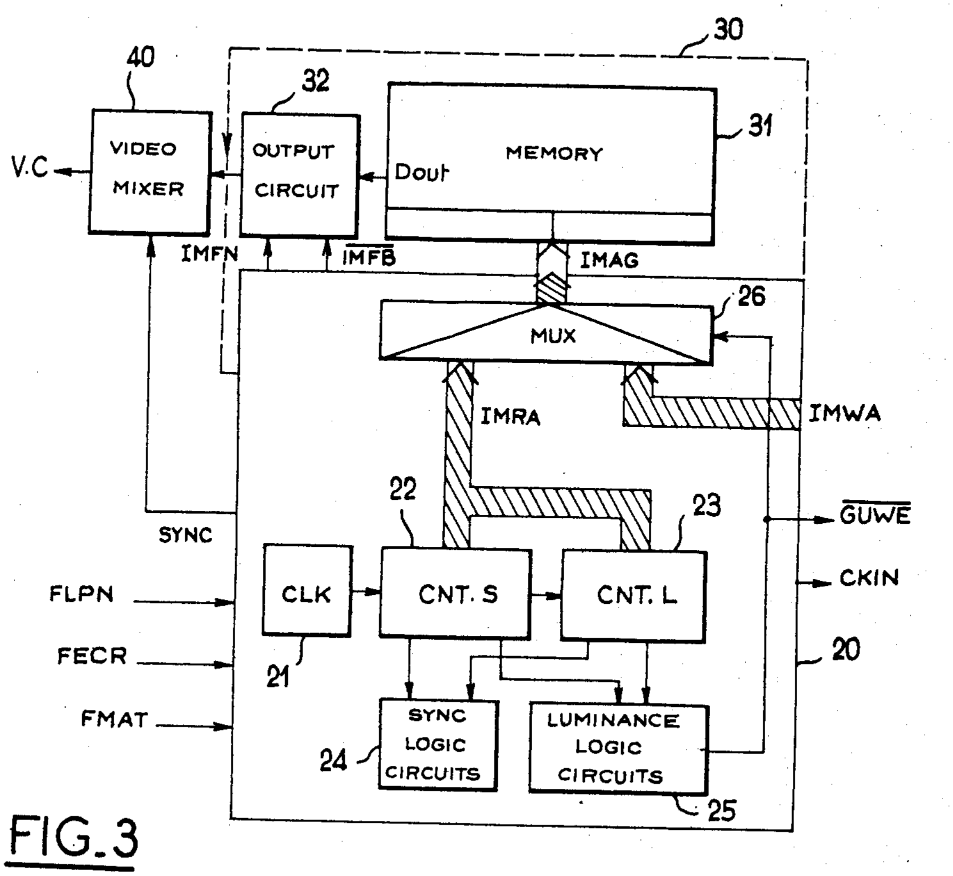

FIG. 3 shows a display signal generator according to the invention in a block schematic form. This generator produces a series of signals which enable the scanning of the TV set to be synchronised, the image memory to be addressed for reading, the luminance of the cathode screen to be controlled and the timing of the graphic unit to be controlled.

The generator 20 comprises the following elements:

a clock (CLK) 21 which may with advantage be a quartz oscillator of the electronically tunable type (VCXO). The frequency Fo of the signal delivered by this clock is given by the following relation:

$Fo = FT \cdot NL \cdot Np \cdot KL$ where, in the example of application selected:

FT is the frame frequency of the TV scan = 50 Hz

NL is the number of TV lines per frame = 312.5 in the interlaced frame format and 312 in the paired frame format, Np is the number in dots per line of the graphic image = 512 in the above definition, KL is the ratio of the number of dots in one scan line to the number of dots in one line of the graphic image = 7:4, whence Fo = 14 MHz for a definition of 512 dots which corresponds to a number of dots NpKL per TV line of 896 dots;

a synchronous counter which comprises two linked counters, namely a modulo-896 counter (CNT.S) 22 and a modulo 312 or 312.5 (depending on the format of the TV image)-counter (CNT.L) 23; these counters comprise means for modifying the format of the TV scan, more particularly a counter indicating the parity of the current frame (i.e whether the frame is even/odd); these counters deliver the reading address signals required for the image memory 31 through the bus IMRA;

a logic means 24 which generates synchronising signals SYNC for the TV scan from the of the contents counters CNT.S and CNT.L;

a logic means 25 which produces luminance signals IMFN and $\overline{\text{IMFB}}$ and a control signal GUWE for the graphic unit and for a multiplexer 26 for the reading and writing address signals;

a multiplexer 26 for the writing address signals IMWA and the reading address signals IMRA which delivers addressing signals IMAB along a bus to the image memory 30;

an image memory 30 which comprises the actual memory element 31 and an output circuit 32 which receives, on the one hand, the output signals Dout of the memory and, on the other hand, the luminance control signals IMFN and $\overline{\text{IMFB}}$ which enable the video output signal V to be forced either to the "white" level or to the "black" level.

The generator 20 receives:

a signal FMAT which enables the format of the TV image to be modified; this signal is at the high level when the desired format of the TV image corresponds to the interlaced frame desired format and at the low level when the format of the TV image corresponds to the paired frame format;

a signal FLPN which enables the cathodic screen of the console to be forced to the "white" level in order to locate the position of a dot on the screen by means of a or light pen;

a signal FECR which enables operation to be forced to the writing mode with a view to increasing the generation rate comprising the data of the graphic image;

address signals IMWA for writing the data into the image memory.

In order to facilitate the description of the display signal generator, the characteristics of the memory modules, typically (packages) dynamic RAM type, are discussed hereinafter.

Figure 4A:
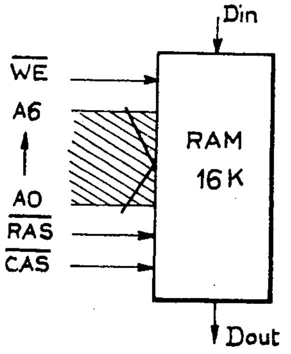

FIG. 4*a* diagrammatically illustrates a memory module having a capacity of 16 K words of one bit of which the address inputs Ao–A6 are multiplexed. Internally the memory is organised into a matrix of 128 rows and 128 columns. The principal signals associated with the memory module are as follows:

the signal $\overline{\text{RAS}}$ (row address select) of which the falling edge samples the first (lower) part of the address;

the signal $\overline{\text{CAS}}$ (column address select) of which the front edge samples the second part (upper part) of the address;

the signal $\overline{\text{WE}}$ (write enable) which indicates a writing operation;

the input signal which is sampled by the signal $\overline{\text{CAS}}$ in the writing mode;

the output signal Dout which is shaped by the signal $\overline{\text{CAS}}$ in the reading mode.

The memory comprises as many refresh amplifiers as there are columns so that, upon access to the memory, a complete row is refreshed. Apart from some minor variations, the same considerations apply to other types of memory modules e.g. 4 K, 8 K, etc.

Figure 4B:
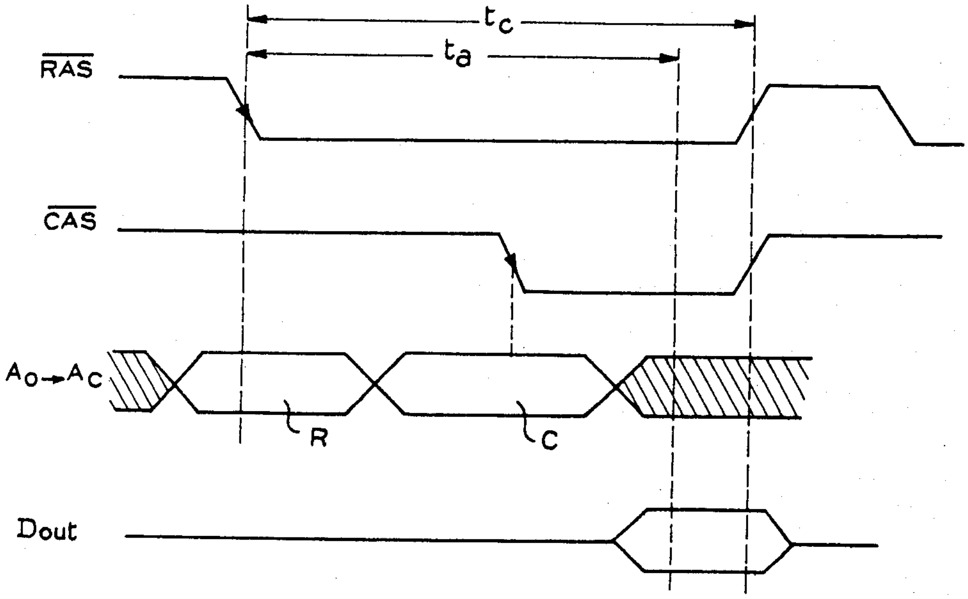

FIG. 4*b* shows a chronogram of the principal control signals of a memory module. The time tc corresponds to the cycle time and the time ta to the access time.

The address signals Ao–A6 are multiplexed; the first part R corresponds to the low part of the addresses and enables the rows to be selected whilst the second part C corresponds to the high part of the addresses and enables the columns to be selected. The last line of the FIG. 4*b* represents the output signal Dout of the memory.

For a given application, it is desirable to be able to modify the definition of the graphic image, i.e. the number of dots forming an image. By way of illustration, four values of the definition of the graphic image will be considered:

(512×512) dots with interlaced scanning—signal FMAT at the high level (256×256) dots with paired frames—signal FMAT at the low level (128×128) dots with paired frames—signal FMAT at the low level (64×64) dots with paired frames—signal FMAT at the low level.

As will be described hereinafter, the definition of the graphic image is obtained by the organisation of the image memory and by adapting the conditions under which it is addressed by the reading and writing address signals.

Figure 5:
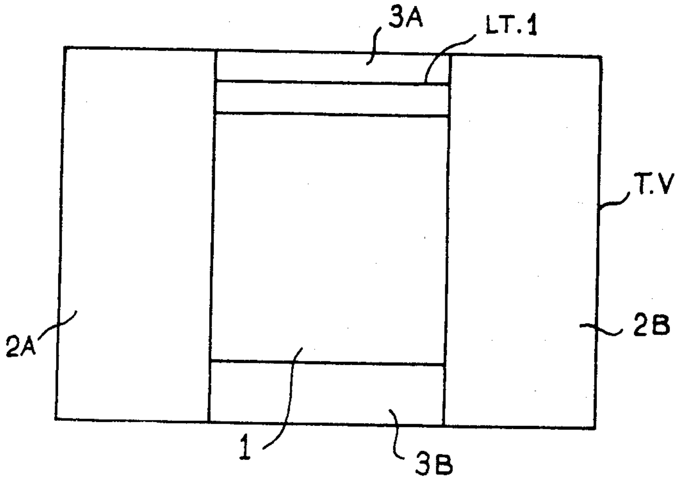

FIG. 5 shows the various zones in which the CRT screen of the graphic console is divided. The area denoted by the symbol TV delimits the TV image resulting from the TV scan effected by the TV set. The zone 1 corresponds to the displayed graphic image; the zones 2A and 2B respectively correspond to the left-hand and right-hand margins of the graphic image whilst the zones 3A and 3B respectively correspond to the top and bottom margins of the graphic image. The line LT1 is a line at the "white" level which, as will be described hereinafter, results from a test signal intended to identify the "white" level of the graphic image. The image memory is refreshed during those periods of time which correspond to the scanning of zones 3A and 3B. Writing into the memory takes place during the periods of time corresponding to the scanning of zones 2A and 2B and also during the remainder of the time where signal FECR is at the high level.

The display signal generator or control unit essentially comprises:

(a) a synchronous counter incremented by the falling edge of a clock signal; this synchronous counter generates the reading/display address signals associated with the image memory, (b) the synchronising signals for the TV scan and the control signals of the graphic unit, (c) a logic means for producing the signal SYNC for synchronising the scanning of the TV set, (d) a multiplexer for multiplexing the read and write addresses in the image memory a multiplexer for multiplexing the low and high parts of the addresses, (e) means for modifying the partition of the address signals according to the format of the TV image desired (interlaced or paired frames).

Conceptionally, the synchronous counter may be divided into a low frequency part, of which the period is equal to the period H of a TV line and which wll be called the "horizontal counter", and an high frequency part of which the period is the period of a TV image, equal to 625 H, which will be called the "vertical counter".

Figure 6A:
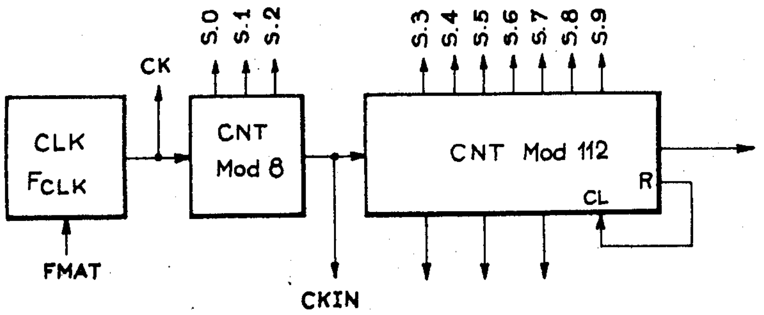

With regard to the horizontal counter, it will be recalled that in the illustrative embodiment a TV line comprises 896 dots of which 512 form the graphic image and 384 the left-hand and right-hand margins, which correspond to the spaces reserved for the writing periods associated with the image memory. As shown in FIG. 6*a*, this counter may be made up of ten sections because $$2^9<896<2^{10}$$

the outputs of the counter being identified by the references S.0 to S.9. This counter may be in the form of two linked counters: a low modulo-8 part (S.0–S.2) and an high modulo-112 part (S.3–S.9). The low part of the horizontal counter is incremented by the signals of the clock CLK which operates at a frequency of 14 MHz in the interlaced frame format, whilst the high part of the horizontal counter is incremented by the output of the lower part which delivers a signal CKIN of period $To=8/F_{CLK}$ which will be used as a clock signal for the vertical counter.

Figure 6B:
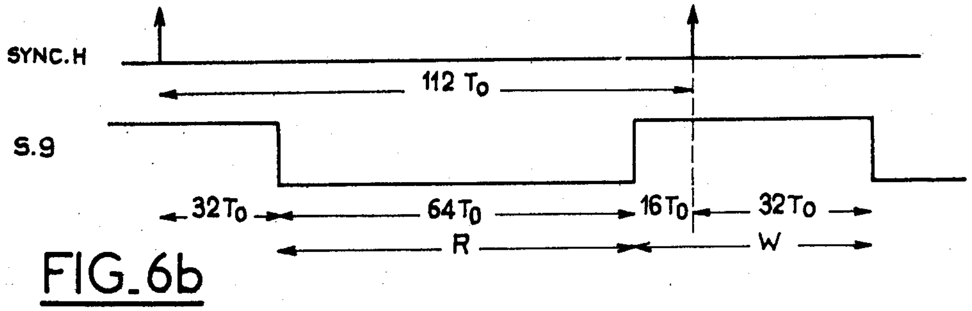

FIG. 6*b* is a chronogram of the signals of the horizontal counter. The duration of a TV line defined between the two pulses SYNC.H is equal to 112 To; the duration of a line of the graphic image is equal to 64 To and the duration of the margins (including the retrace duration of the TV scan) is equal to 48 To, distributed as indicated in the Figure. If the modulo-112 counter is reset to zero when the state $\mathbf{111}_{10}$ is recognized, the output signal S.9 defines the reading/display period R and the writing period W. The horizontal counter also has to produce line transfer signals R.L and half-line transfer signals R.L/2 for the vertical counter and synchronising pulses H and H/2.

Figure 7A:
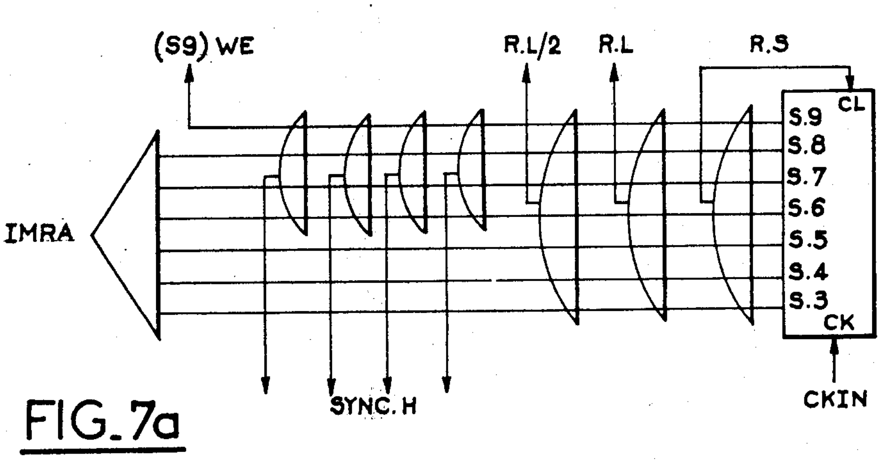
Figure 7B:
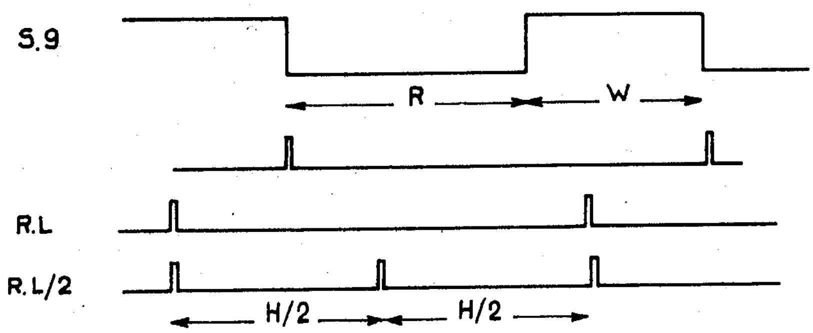

FIG. 7*a* is a circuit diagram of the high part of the horizontal counter in which the counter-content recognition circuits are symbolised by logic gates of the "AND"-type. The output signals S.3 to S.8 form the low part of the reading addresses IMRA of the image memory; the output signal RS of the first recognition circuit resets the counter to zero at its input CL, whilst the signal S.9 represents the signal GUWE which enables the writing operations. The chronogram of the corresponding signals is shown in FIG. 7*b*.

In one preferred embodiment, the recognition circuits are simplified by using "flip-flops". In this case, it is sufficient to use four, less complex recognition circuits and two D-type flip-flops which enable the signals to be time-shifted by eight clock periods. This embodiment of the horizontal counter is shown in block schematic form in FIG. 8*a*. The vertical counter comprises:

a counter 100 incremented by the clock signal CKIN (1.75 MHz) supplied by the modulo-8 counter shown in FIG. 6*a*, four recognition circuits A, B, C and D, a logic gate 101 of the "AND" type which delivers a clearing signal to the counter 100 at its input CL, a logic gate 102 of the "AND" type which delivers a line transfer signal RL to the horizontal counter, a logic gate 103 of the "AND" type which delivers a half-line transfer signal RL2 to the horizontal counter, a logic gate 104 of the "OR" type which effects the logic addition of the recognition circuits C and D, a delay flip-flop 105 of the synchronous type which shifts the output signal of the recognition circuit C by 8 To (To=period of CKIN), a bistable trigger 106 of the synchronous type which shifts the output signal of the recognition circuit D by 8 To.

Figure 8A:
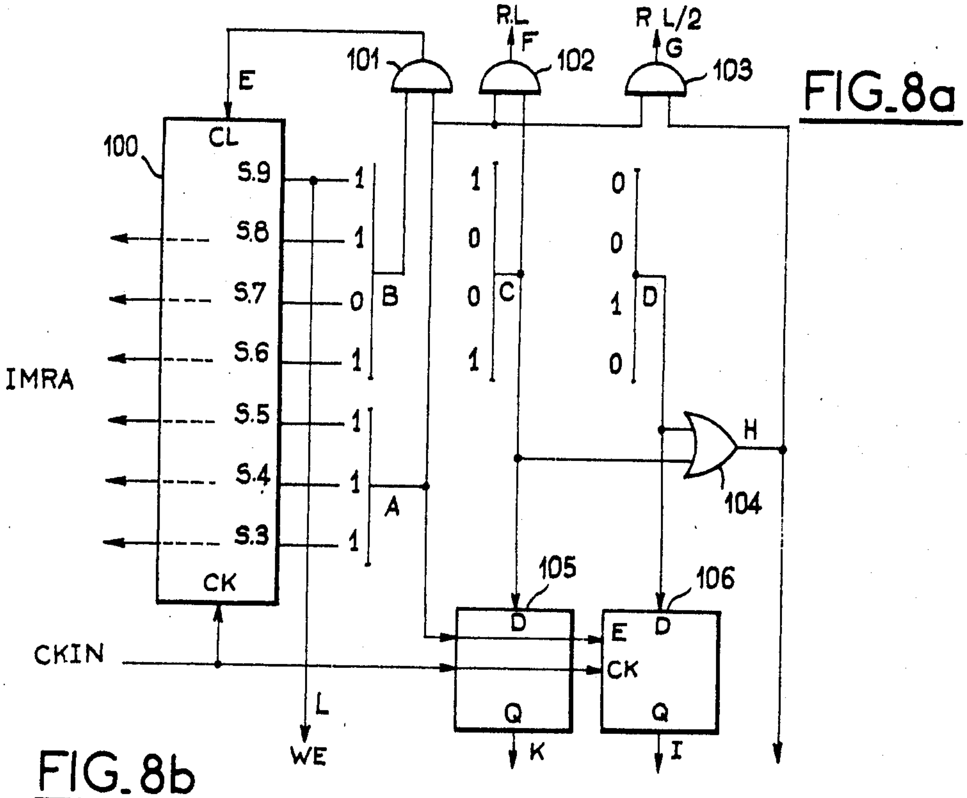
Figure 8B:
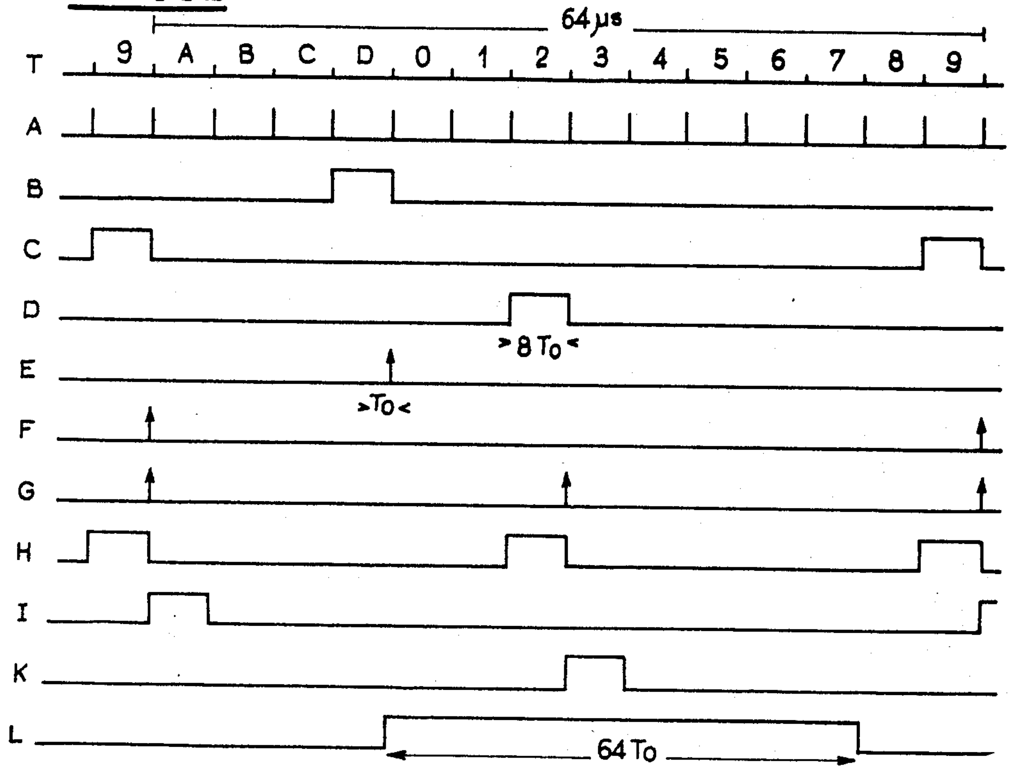

The signals associated with these various elements are shown in FIG. 8*b*. The line T represents the time scale in hexadecimal numeration, each interval being equal to 8 To.

If the generator were to function solely in the paired frame format, the foregoing considerations would make it possible to form a vertical modulo-312 counter with 256 lines for the graphic image and 56 lines for the vertical margin, for example 16 lines at the bottom of the image and 40 at the top (including the retrace time of the TV scan), the recognition of the state 311 being used for resetting the vertical counter to zero (synchronous clearing).

In order to form a vertical counter which can operate in both TV formats (interlaced and paired), the period of the vertical counter has to be 625 H (H=period of a TV line); the shortest event to be recognised is H/2 because half the frame pulses begin at the middle of a TV line. The number of states of this vertical counter is, thus, equal to 1250; hence, it will comprise eleven stages because $$2^{10}<1250<2^{11}$$

The sequencing of the 1250 states of this vertical counter has to be such that:

nine output signals directly supply the vertical display addresses of the image memory, the most significant bit indicating the parity of the frames in the case of the (512×512) dot format, the frame synchronising pulse has to be easy to generate, a test signal LT1 has to be formed, a signal indicating the beginning and the end of the graphic image has to be generated.

Figure 9:
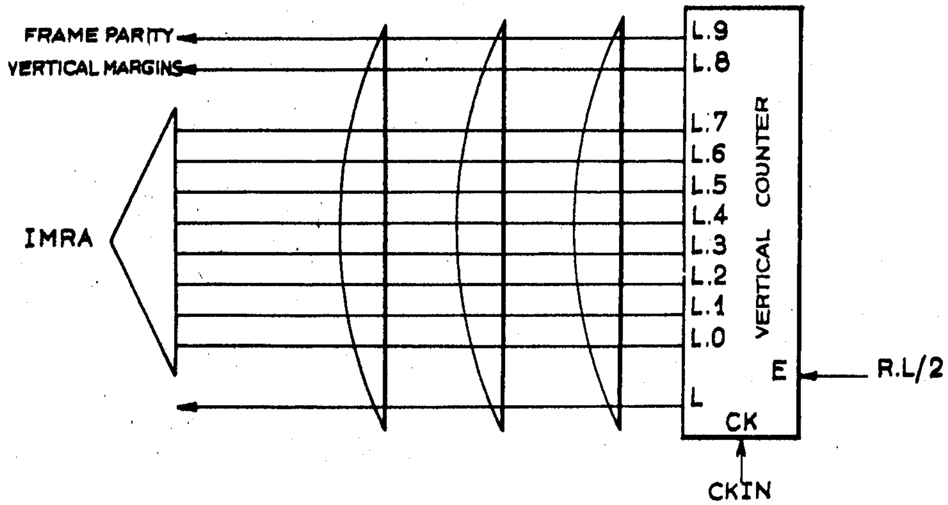

A conventional embodiment of a synchronous, eleven-stage counter is diagrammatically illustrated in FIG. 9. It is incremented every ½ line by the signals RL/2 of the horizontal counter. If it is considered that each frame contains an odd number of ½ lines (625 in this example), it follows that, for one frame out of two, the outputs of this counter changes at the middle of a line, so that these outputs cannot be used for the direct vertical addressing of the image memory.

Figure 10:
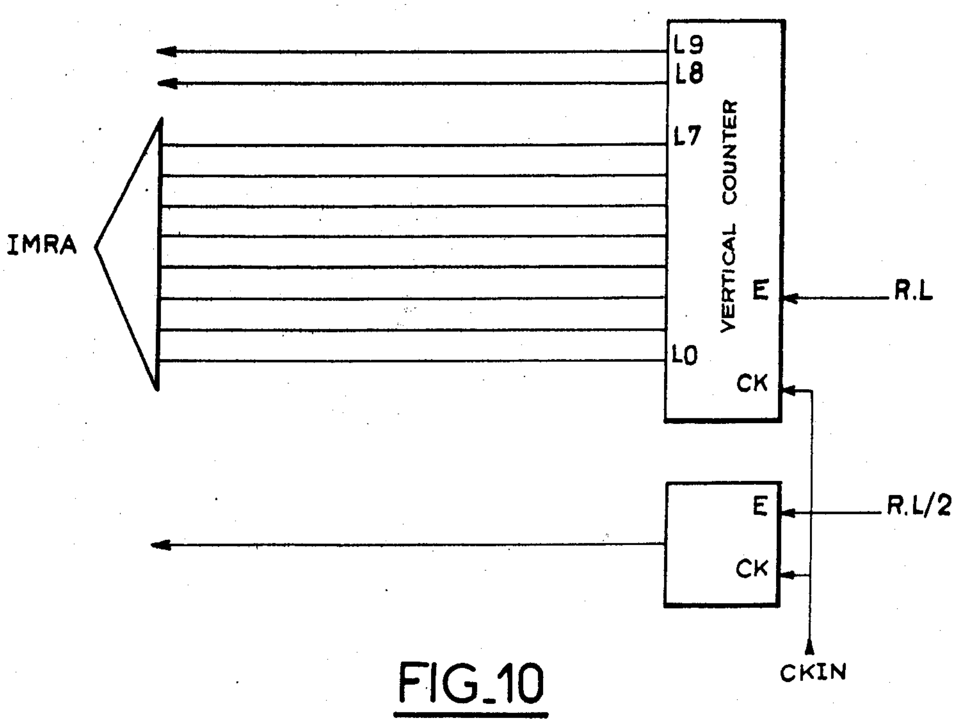

The configuration of the counter shown in FIG. 10 enables the above deficiency to be eliminated. The ten most significant bits are incremented at the end of a line whilst only the less significant bit switches with each ½ line. So far as the rest of this discussion is concerned, it is possible to temporarily ignore the most significant bit (MSB) and to look for the means to obtain a periodicity of 312.5 H for the other bits.

Referring to FIG. 11*a* (m, n) represent the states of these counters, m being the decimal value of the nine-stage counter and n being a ½ line bit (0, or, 1). Recognition of the value (312.0) results in a reset to zero (e.g. a clearing) in synchronism with the ½ line transfer of the ten bits in question; the cross (X) indicates the instant when this "clearing effect" begins. FIG. 11*a* shows that, in every case, one period of (312.5) H separates two consecutive crosses, the sequence of the frames being indicated by the solid-line arrows. In addition, one way of suppressing the interlacing of the frames is to ignore the ½ line bit and to effect a reset to zero (clearing) when the value (312, X) is recognised. The non-interlaced sequence is situated in the right-hand column and is indicated in the FIG. 11*a* by the dotted-line arrow.

The frame parity bit may be formed in two ways:

(a) it is possible to use the carry comprising recognition of the value (312.0) for switching this bit, (b) it is possible to record the value of the least significant (half-line) bit with each line pulse because it is different from one frame to another.

This second alternative may be preferable, although less sensitive to possible spurious effects, because the value of this bit is more frequently updated. Accordingly, this bit will be at those level "1" during the frames which correspond to the left-hand part of FIG. 11*a* and at the level "0" for the right-hand part, so that it will be exactly the LSB bit (and not its opposite) counting downwards, because the right-hand line (0, 0) is above the left-hand line (0, 0).

At this stage, the configuration of the vertical counter has the following defect: the recognition of the "frame synchronising pulse" is different with even frames and with odd frames. There are two possible solutions to overcome this deficiency:

(a) the recognition circuits in the vertical counter are replaced by recognition circuits arranged at the outputs of a small, additional counter incremented every ½ line and released by the "clear" signal of the principal counter. The number of stages in this additional counter must be equal to 4 because the total duration of the frame pulse is equal to 15 half lines+one stop state. The advantage of this solution is that it eliminates the long connections of the recognition circuits which is advantageous from the point of view of manufacturing the device by integrated circuit technology. On the other hand, it has the disadvantage of adding a four-bit counter.

(b) the sequencing of the counter may be modified in the vicinity of the frame pulse as follows: if the high part of the counter has a value below 8, the input transfer of this part will be calculated on the low stage (½ line bit), even if it occurs at the middle of the line. This gives the beginning-of-frame sequence shown in FIG. 11*b*. The left-hand part remains unchanged whereas, in the right-hand part, it is the state (8, X) which lasts for half a line instead of the previous state (0, X).

The frame synchronising signal is formed as follows:

pre-equalising period: (0, X)+(1, X)+(2, 0)

period of the frame pulse: (2, 1)+(3, X)+(4, X)

post-equalising period: (5, X)+(6, X)+(7, 0).

One way to directly form the frame signal is to recognise the following periods:

(a) envelope of the frame signal from (0, X) to (7, 0);

(b) period of the frame signal from (2, 1) to (4, X).

In order to complete the vertical counter, it is necessary to shift the states of this counter by a fixed amount so that the state "0" occurs at the first line of the graphic image.

The change of frame takes place through recognition of the state 272=(312−40) and then by effecting a jump to 472, taking into account the fact that $2^9-312=200$ (10). In addition, it is necessary to recognise the line (19, X) or the test line LT1, i.e. the state (491, X) after shifting. Finally, it is necessary to use the inverted outputs of the line numbers and the frame parity bit so that the line 0 of the graphic image is situated at the bottom of the screen.

The organisation of the image memory will now be considered. The video output signal of the image memory successively describes the state of each of the points of one and the same line. A horizontal definition of 512 points corresponds to a duration of less than 100 ns per dot (dot clock frequency 14 MHz). The access times of commercially available memory modules (packages) are of the order of 350 ns. It is therefore necessary simultaneously to read several dots which differ solely in the low part of their horizontal address and then to serialise these dots by means of a shift register in order to form the video signal. Accordingly, the image memory has to be organised into words of n bits, for example:

| Definition | n | Memory modules | Organization |
|---|---|---|---|
| 512 × 512 | 8 | 16 × 16 K bits | 32 K words of 8 bits |
| 256 × 256 | 4 | 4 × 16 K bits | 16 K words of 4 bits |
| 128 × 128 | 2 | 4 × 4 K bits<br>2 × 8 K bits | 8 K words of 2 bits |
| 64 × 64 | | 1 × 4 K bits | 4 K words of 1 bit. |

In order to increase the number of bits necessary for describing one dot (e.g. colours, half-tone, superposition, etc.), the memory/image register assembly has to be multiplied by the corresponding number of bits, the number and length of the words remaining constant because allowance has to be made for the fact that the memory unit increases in a third dimension.

Figure 12A:
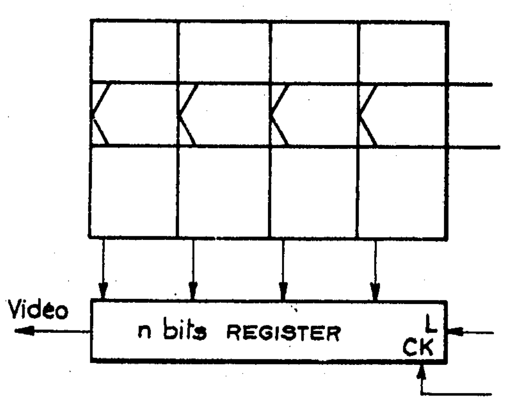
Figure 12B:
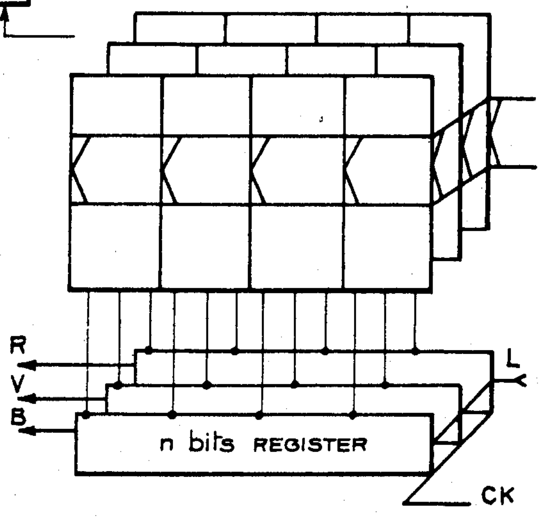

FIG. 12*a* shows a configuration of the image memory intended for application to a monochrome TV set whilst FIG. 12*b* shows by way of comparison a configuration of the image memory suitable for application to a colour TV set of the three-colour (red, green and blue) type.

For an application with half-tones, the outputs of the shift registers are decoded in a three-bit digital-analog converter. In an application with superimposed images, the outputs of the shift registers may be applied to a logic gate of the "OR"-type.

The addressing method just described does not enable the problem to be completely solved because, in the writing mode, the graphic function generator or graphic unit GRAPH has to have access to the memory cells one by one. It is therefore necessary to use the low part of the horizontal writing address for selecting the bit in question in the word memory.

If, solely in the interests of simplification, the representations (512×512) dots (16 memory modules) and (256×256) dots (4 memory modules) are considered, it is not economical to use 16 conductors between the generator and the memory unit, but rather to limit this connection to four conductors, the LSB horizontal address (for 4 bits) issuing directly for the representation (512×512) dots and being decoded for the representation (256×256) dots (in the form of $\overline{RAS}$) for directly connecting them to the memory modules. The function of these four conductors (called IMSL 0 to 3) depends on the signal FMAT which specifies whether the generator is to operate in an interlaced or paired TV format. In a representation using 512×512 dots, it is thus necessary to introduce a decoder.

For a reading operation in the image memory, it is necessary to read all the bits of one word together. In a representation using 256×256 dots, the selection signals IMSL perform this function and, in a representation using 512×512 dots an additional signal $\overline{GUWE}$ indicates the reading periods and has to force half the outputs of the decoder to the low level (cf. FIG. 16).

In the two representations, the displayed portion of the addressable logic space is different, although the display precision is identical with the logic precision used for describing the drawings.

Figure 13:
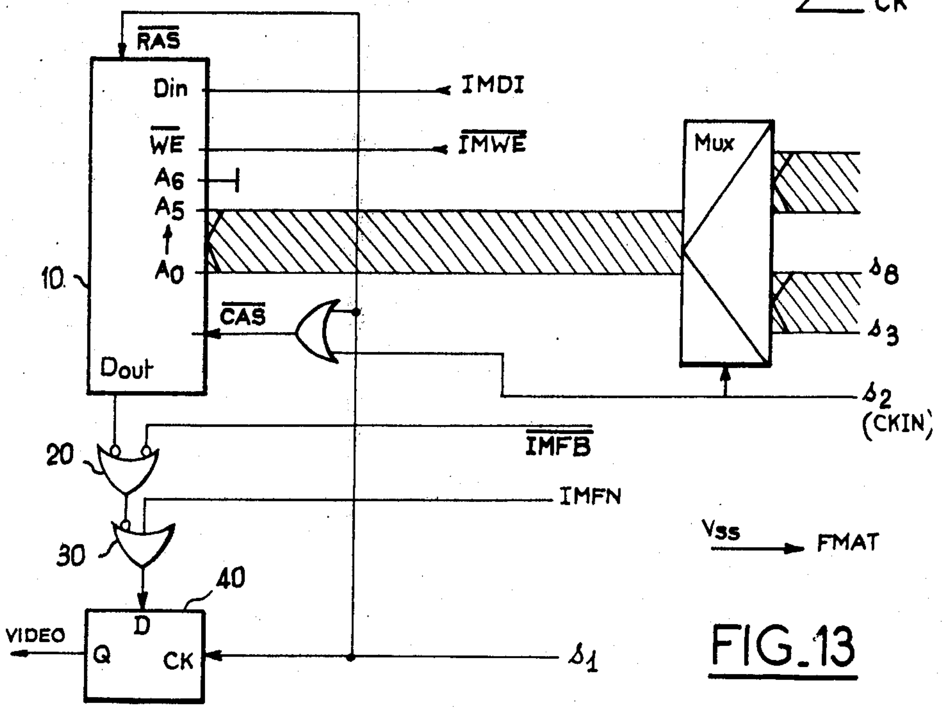
FIG. 13 shows the organisation of an image memory adapted to a dot representation (64×64) of the graphic image.

If now the definitions of the graphic image below 256×256 dots are considered, the input FMAT has to be identical with the case of 256×256 dots/same logic level. The outputs IMSL are grouped 2 by 2 in a representation using 128×128 dots and 1 by 1 in a representation using 64×64 dots (in this event, the signals IMSL are in any case unnecessary, as indicated in FIG. 13).

The vertical addressing is effected in the same way, ignoring one bit for a representation using 128×128 dots and two bits for a representation using 64×64 dots.

The display precision is no longer the logic precision. For example, one dot comprising an image of 128×128 dots corresponds to an logic "OR" of four dots of the image comprising 256×256 dots.

In conclusion, in a representation comprising 256×256 dots (and lower definitions), the address of the dots is formed by 16 bits of which two are decoded in IMSLi whilst the other 14 are delivered, in two groups, to the terminals IMABi. In a representation comprising 512×512 dots, the address comprises 18 bits of which 4 are delivered to the terminals IMSLi and the other 14 to the terminal IMABi.

In order to illustrate what has just been described, some examples of the organisation and addressing of the image memory are described in the following:

A representation comprising 64×64 dots (FIG. 13) requires a single memory module of 4K×1 bit, access to the bits being sequential along a line. Each line is repeated four times. The frequency of the clock (signal S.1-3994, 4 KHz) is equal to twice the dot clock to enable the signal $\overline{CAS}$ to be formed. The output Dout of the memory module 10 is delivered to a logic "OR" gate 20 which, on the other hand, receives a signal $\overline{IMFB}$ enabling the video signal to be forced to the "WHITE" level. The output of the gate 20 is delivered to a gate 30 of the "OR" type which, on the other hand, receives a signal IMFN enabling the video signal to be forced to the "BLACK" level. The formation and function of these two signals $\overline{IMFB}$ and IMFN will be described hereinafter. Since the output of the memory is not always valid, a D-type flip-flop 40 is connected to the output of the part 30. Finally, a bistable circuit 50 enables the output frequency of the oscillator 60 to be divided by a factor of 2.

Figure 14:
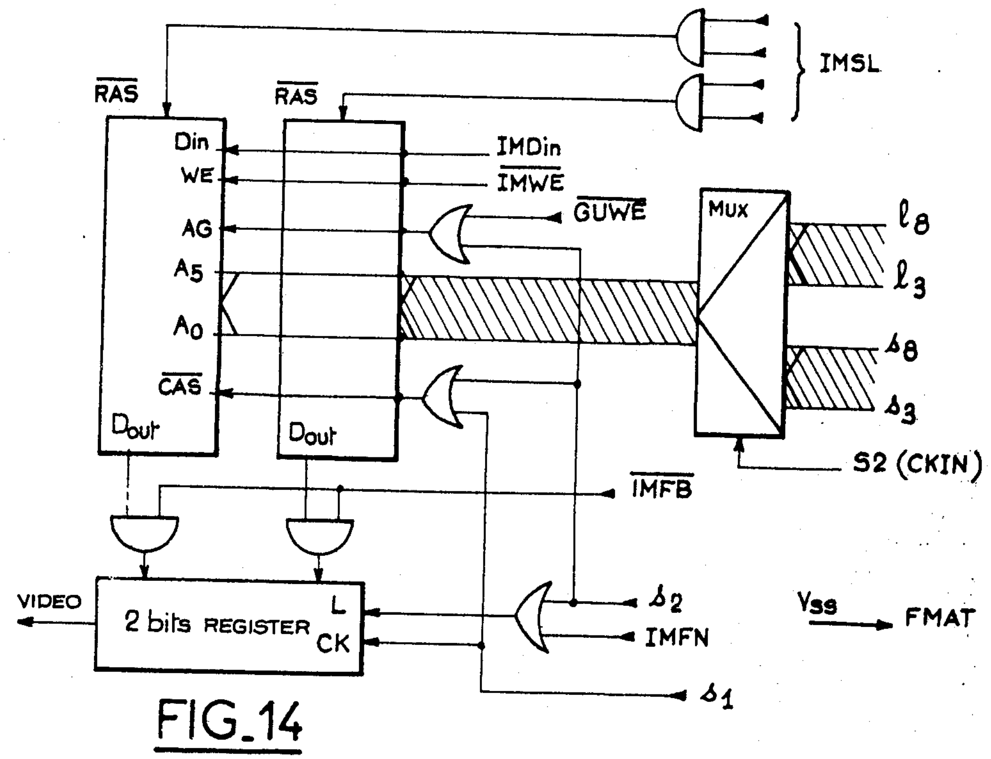
FIG. 14 shows the organisation of an image memory adapted to a dot representation (128×128) of the graphic image.

A representation comprising 128×128 dots (FIG. 14) requires two memory modules of 8K bits or 4 memory modules of 4K bits. The address IMAB 6 is only used for its low part. A clock 60 operates at the dot frequency, enabling the register 40 to be shifted and the signal $\overline{CAS}$ to be generated. The signal IMFN intervenes by preventing loading of the register. Under these conditions, forcing to the "BLACK" level occurs if the series input of the register is at the higher level. It is also possible to use a memory module of 16K bits, providing it has a cycle time of less than 275 ns. In this case, access is at the dot frequency. The additional address is supplied in the writing mode by the signals IMSL and in the reading mode by an external divider 50.

Figure 15:
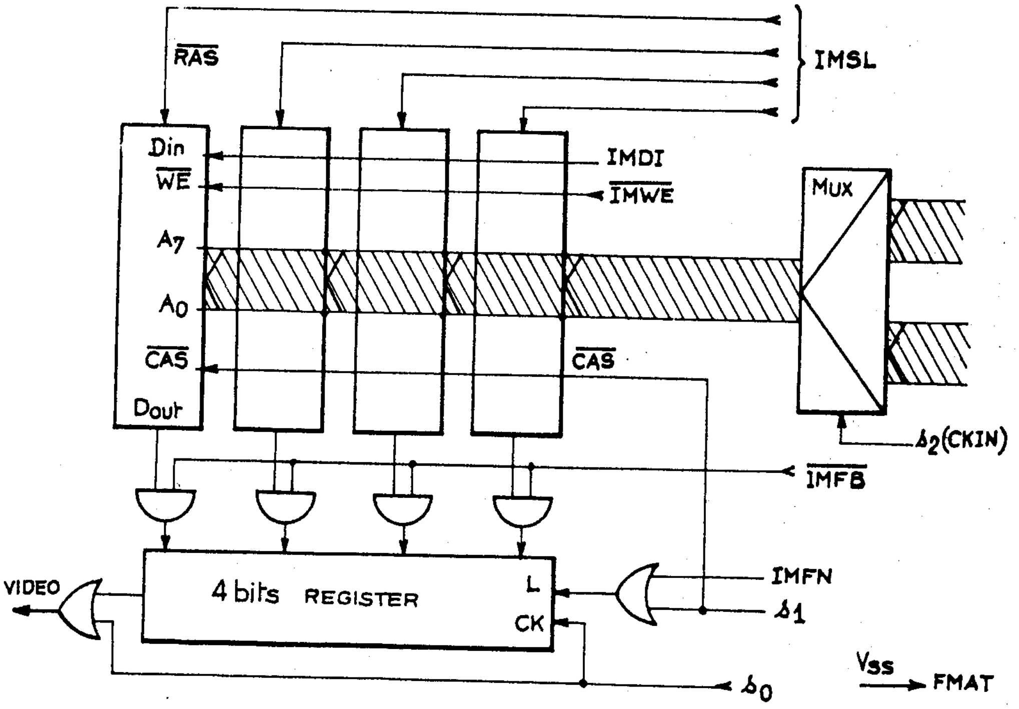
FIG. 15 shows the organisation of an image memory adapted to a dot representation (256×256) of the graphic image.

A representation comprising 256×256, dots of which the layout is shown in FIG. 15, does not prompt any particular remarks.

Figure 16:
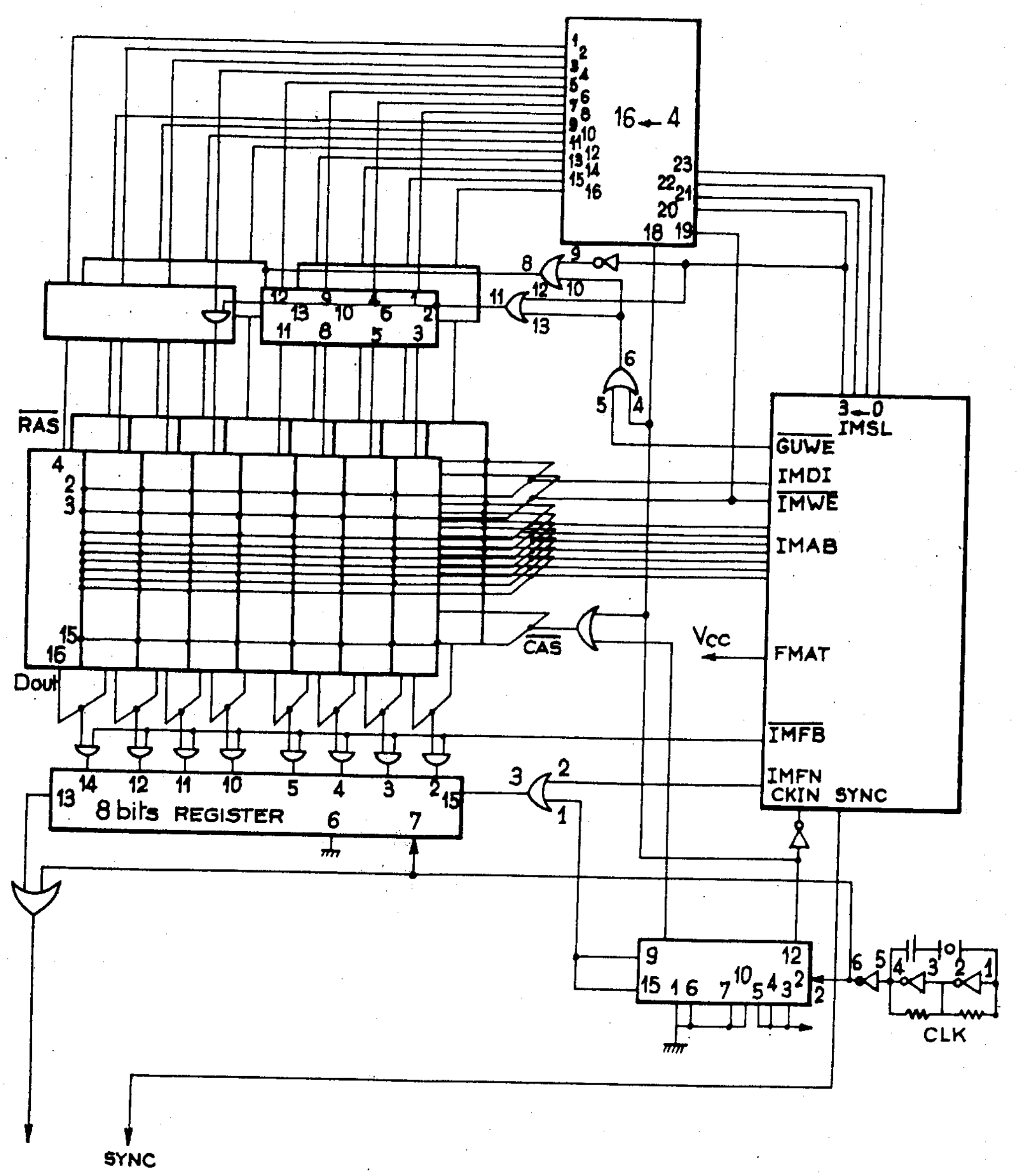
FIG. 16 shows the organisation of an image memory adapted to a dot representation (512×512) of the graphic image.

A representation comprising 512×512 dots, of which the lay-out is shown in FIG. 16, requires 16 memory modules of 16K bits. These modules are in a 2×8 arrangement. For a reading operation, 8 memory modules are selected by conjugating the signal $\overline{GUWE}$ and IMSL.3 which, thus, carries a display address. All the memory modules are read in two TV frames. The separation of the TV lines according to their parity does not coincide with the separation into two halves. Unless one half is refreshed during a frame, the half used would be switched every two lines of the same frame (due to the output IMSL.3), i.e. every 128 accesses. In this case, the frequency of the dot clock is 14 MHz.

In what has just been described, wherein the frequency of the oscillator is adapted to the definition of the graphic image, it is possible to use a single clock associated with a modulo-8 counter and to form the clock by an electronically tunable oscillator which receives the signal FMAT.

The distribution of the address signals associated with the image memory will now be described.

The display address serves 18 bits S0, S.1, S.2, S.3, S.4, S.5, S.6, S.7, S.8 (low part) and frame parity L.0., L.1, L.2, L.3, L.4, L.5, L.6, L.7 (high part), the writing address being assumed to be similarly 18 bits X.0, X.1, X.2, X.3, X.4, X.5, X.6, X.7, X.8 and Y.0, Y.1, Y.2, Y.3, Y.4, Y.5, Y.6, Y.7, Y.8.

In this case, it is necessary:

to multiplex these addresses according to the writing and reading periods defined by the signal GUWE resulting from the logic addition of the signal S.9 (WE) and the signal FECR (writing command), to associate the different writing addresses and the reading/display addresses depending upon the level of the signal FMAT which specifies the format of the TV image (interlaced or paired). $\overline{FMAT}$ corresponds to a paired-frame format to distribute these addresses between the input pins of IMAB and IMSL to multiplex the high and low parts of the addresses at the IMAB outputs at the rate of the clock signal CKIN.

It is assumed that the signals of the dot clock CLK and the signals S0 to S2 produced by the modulo-8 counter are available outside the signal generator.

Considering for the moment solely the distribution of the addresses between the outputs IMAB and IMSL, the addresses are distributed as illustrated in FIG. 17*a*, which corresponds to the case of a definition of 256×256 dots and lower, and in FIG. 17*b* which corresponds to a definition of 512×512 dots.

With regard to a representation comprising 512×512 dots, it will be recalled that the signal available at the output IMSL.3 is used for selecting half the image memory and changes every two lines in a display period in order to satisfy requirements concerning the refreshing of the image memory.

FIG. 17c shows the multiplexing circuits which supply the signals at the outputs IMSL. The multiplexer 300 with four outputs of the 2-1 type is controlled by the signal FMAT; the element 301 is a 2-4 decoder controlled by a signal $\overline{IMWE}$ supplied by the graphic unit, this signal enabling a writing operation in the image memory at the low level. The element 302 is a 2-1 multiplexer controlled by the signal $\overline{GUWE}$ whilst the element 303 is an operator means of by which the outputs of the decoder 301 are forced to the zero level and which is controlled by the signal $\overline{GUWE}$. The element 304 is a logic operator of the "OR" type which enables the signals to be shaped to generate a signal $\overline{RAS}$ and which is controlled by the clock signal CKIN.

The address signals now have to be distributed between the outputs IMAB in dependence upon the three control signals FMAT, $\overline{GUWE}$ and CKIN. In order to disregard the multiplexing according to the signal CKIN between the high and low parts of the address, the outputs IMAB will be called R0, R1, . . . R6, C0, C1, . . . C6, remembering that there are 14 of these outputs.

The distribution of the various address signals is shown in the Table (page 27). This Table should be considered as the concatenation of a 512×512 table (left-hand part) and of a table corresponding to representations of lower definition right-hand part which would have column 3 in common. It should be noted that there is no correspondence between the group of columns 1 and 2 or between the group of columns 4, 5, 6 and 7.

The method is as follows:

1. The names of the reading/display addresses available are written in column 3.
2. Columns 1 and 5, 6, 7 may then be filled according to the writing/reading correspondences defined in the description of the organisation and addressing of the image memory.
3. An attribute "IMSL" is then made to the writing addresses supplied to the outputs IMSL, after which the names of the 14 outputs R0, . . . R6, C0, . . . C6 have to be placed in the columns 2 and 4.
4. C6 is then placed at "a" and R6 at "b" according to the applications corresponding to representations of 64×64 and 128×128 dots.
5. An address Ci has to be placed at "c" to enable the memory image to be refreshed in the case of a 512×512 dot application, noting that the "frame parity" signal only varies every 20 ms. To this end, C6 is placed at "c" at the same time as R6 is placed at "d" in order to minimise the differences between the columns 2 and 4 and, hence, to reduce the complexity of the multiplexers.
6. It remains to complete columns 2 and 4 by outputs Ci at the top and outputs Ri at the bottom of the Table, opposite the reading addresses which vary the most rapidly, in order to provide for the best possible refresh of the image memory. By having identical numbers in columns 2 and 4, the number of inputs of the multiplexers which produce the outputs IMAB are limited to 6; for example the output IMAD.3 alternately supplies S5, L4, Y5, Y4, X5, X4.

FIG. 18 shows one embodiment of the address multiplexers which remains relatively simple despite the large number of connections. The multiplexers are advantageously formed by MSI (mediumscale integrated circuit) and SSI (small-scale integrated circuit) modules. In one embodiment built and tested:

The multiplexer which supplies the outputs IMAB is formed by seven LS151 IC's;

the multiplexer which supplies the outside IMSL is formed by 1 LS 157 IC;

the decoder for the addresses X0 and X1 is formed by 1 LS 139 IC.

It is now possible to formulate the complete diagram of the signal generator (without multiplexing) as illustrated in FIG. 19.

Accordingly, the signal generator comprises the following elements an external clock CLK or dot clock shown in FIG. 6a; it may comprise an input FMAT which enables the output frequency of the signal CK to be electronically modified in dependence upon the format of the TV image, a modulo-8 counter CNT shown in FIG. 6a which produces the signals S.0, S.1 and S.2 and which delivers the clock signal CKIN for sequencing the elements of the generator, the horizontal modulo-112 counter 100 which delivers the reading address signals S.3 to S.8 and the signal S.9 (WE) which defines the reading and writing periods associated with the image memory, the elements already shown in the FIG. 8a, the recognition circuits A, B, C and D, the delay flip flops 105 and 106 and the logic gates 101, 102, 103 and 104, the vertical counter 200 which comprises an enabling input E and an input PS for presetting to the state 472.0; this counter supplies the reading address signals L0 to L7 and a signal L8 which defines the upper and lower portions of the graphic image, a flip flop circuit 201 of the T-type which comprises an input T, a clearing input CL and a clock input CK and which, at its output Q, supplies a signal at the rate of half a TV line, a flip flop 202 of the D-type which samples the output of the flip flop circuit 201 by means of the line transfer signal RL applied to its enabling input E and which, at its output $\overline{Q}$, delivers the frame parity signal P.T, the recognition circuits for recognising the content of the counter 200, the element 203 which recognises the state (272.0), the element 204 which recognises the state (419.X) corresponding to the test line LT1 for the "white" level; the element 205 which recognises the state (≦8); the element 206 which recognises the state (2,1); the element 207 which recognises the state (3,X), the element 208 which recognises the state (4,X) and the element 209 which recognises the state (7,1).

The output signals of the recognition circuits 206, 207, 208 are applied to the inputs of a logic gate 210 of the "OR" type for supplying the frame synchronising pulse.

The output signal of the recognition circuit 209, after inversion by the inverting element 211, and the output signal of the recognition circuit 205 are applied to a logic gate 212 of the "AND" type to supply the envelope signal of the frame synchronisation.

The input E of the counter 200 is controlled by the output signal of a logic gate 213 which, at its inputs, receives the output signals of two logic gates 214 and 215 which form a multiplexing circuit for the transfer signals RL and RL/2. The signal FMAT is applied to a first input of a logic gate 216 of the "NAND" type, this signal being a low level for formats of 256×256 dots and below, whilst the second input of the gate 216 receives the output signal of the half-line trigger 201.

As mentioned above, the signal S9 enables the reading and writing periods associated with the image memory to be differentiated. This signal S9 is applied to a first input of a logic gate 217 of the "OR" type which, at its second input, receives an external signal FECR which enables the system to be forced into the writing mode with a view to accelerating a writing operation which, as a result, interrupts the reading/display mode of operation. The output signal of the element 217 is called GUWE because at the high level it enables the operation of an external graphic unit, being at the low level during the reading/display phases.

The logic means enabling the video output signal of the image memory to be forced into a predetermined state is formed by the logic gates 218, 219 and 220 of the "OR" type and the logic gates 221 and 222 of the "AND" type. This logic means produces two output signals, the signal $\overline{\text{IMFB}}$ enabling the video signal to be forced to "white" and the signal IMFN enabling the video signal to be forced to "black". The signal IMFN is used in particular for "blanking" the video signal outside the graphic image, for example when the output of the image memory comprises spurious signals (e.g. during refreshing and writing phases). The signal $\overline{\text{IFOB}}$ is used at the beginning of each TV frame, in the non-visible part of the screen, for forcing the video signal to the "white" level for the duration of a test line LT.1 and, in addition, enables the cathodic screen to be forced to the "white" level when it receives a signal FLPEN supplied by a light pen.

The logic means which enables the signal SYNC for synchronising the TV scan to be produced is formed by the logic gates 223 and 224 of the "AND" type, the logic gate 225 of the "OR" type and a flip-flop 226 of the D-type enabling the output signal SYNC, of which the wave form is shown in the Figure, to be "blanked".

FIG. 20 shows one embodiment of the signal generator based on MSI and SSI modules:

the horizontal counter 100 is formed by LS/163 IC's,
the vertical counter is formed by LS/163 IC's,
the half-line flip-flop 201 is formed by an LS/163 IC,
the parity flip-flop 202 is formed by an LS74 IC,
the delay triggers 105 and 106 and the output flip-flop 226 are formed by LS74 IC's.

the recognition circuits for recognising the state of the counters (denoted by the letter R in the FIG.) are formed by SFC71301 IC's.

Differences are noticeable between FIGS. 19 and 20, according to the type of logic gates used. However, these minor differences do not justify a particular development in view of the fact that the logic equivalents of the various existing logic gates are known in the art. It is noticeable that the levels of the address signals L0 to L7 are complemented by means of inverting elements 10 to 17.

In addition to the advantages already mentioned, the invention as described in the foregoing provides for a construction which is extremely simple compared with the diversity of the functions performed.

The invention is by no means limited to the embodiment described above. In particular, the magnitudes of the parameters, such as the frame frequency, the line frequency, the format of the graphic image may be modified, for example it is possible to obtain graphic images of 1024×1024 or 2048×2048 dots where a TV monitor is available. The generator supplies signals enabling its operating frequency to be synchronised with the a.c. mains feeding the TV set. The centring of the graphic image may readily be modified by changing the inputs of the recognition circuits. The generator also enables an image memory of the static RAM type to be controlled. Operation of the circuitry according to the invention using the U.S. standard of 525 lines, 60 frames is entirely advantageous.

A signal generator according to the invention may be used in graphic terminals, in alphanumeric display consoles and in electronic games.

| Column 1 Writing addresses 512 × 512 | Column 2 Allocation of the addresses to IAD 512 × 512 | Column 3 Available display addresses | Column 4 Allocation of the addresses to IAD 256 × 256 | Column 5 Writing addresses 256 × 256 | Column 6 Writing addresses 128 × 128 | Column 7 Writing addresses 64 × 64 |
|---|---|---|---|---|---|---|
| Y8 | C0 | L7 | C0 | Y7 | Y7 | Y7 |
| Y7 | C1 | L6 | C1 | Y6 | Y6 | Y6 |
| Y6 | C2 | L5 | C2 | Y5 | Y5 | Y5 |
| Y5 | C3 | L4 | C3 | Y4 | Y4 | Y4 |
| Y4 | C4 | L3 | C4 | Y3 | Y3 | Y3 |
| Y3 | C5 | L2 | C5 | Y2 | Y2 | Y2 |
| Y2 (IMSL) | | L1 | C6 (a) | Y1 | Y1 | |
| Y1 | R6 (d) | L0 | R6 (b) | Y0 | | |
| Y0 | C6 (c) | frame parity | | | | |
| X8 | R0 | S8 | R0 | X7 | X7 | X7 |
| X7 | R1 | S7 | R1 | X6 | X6 | X6 |
| X6 | R2 | S6 | R2 | X5 | X5 | X5 |
| X5 | R3 | S5 | R3 | X4 | X4 | X4 |
| X4 | R4 | S4 | R4 | X3 | X3 | X3 |
| X3 | R5 | S3 | R5 | X2 | X2 | X2 |
| X2 (IMSL) | | | | (IMSL) X1 | (ISML) X1 | |
| X1 (ISML) | | | | (ISML) X0 | | |
| X0 (ISML) | | | | | | |

I claim:

1. A signal generator for displaying on the CRT screen of a TV set the data of a graphic image stored in a refresh memory unit, characterised in that said signal generator comprises:

counting means, incremented by a clock signal at the dot frequency of the image to be displayed, said counting means comprising a horizontal counter, functionally linked to/a vertical counter, for providing read memory address signals;

means for modifying the format of the TV image displayed comprising a half-line flip-flop and a frame parity flip-flop;

means for recognising the state of the said counting means comprising: means for clearing the horizontal counter at the beginning of each scan line forming the graphic image, means for clearing the vertical counter at the beginning of each frame of the graphic image, and means for forming line signals, frame signals and test signals for said image;

means for multiplexing the memory address signals generated by said counting means comprising a first multiplexer governed by the format desired for the TV image, a second multiplexer governed by the reading and writing periods associated with said memory unit and a third multiplexer for multiplexing the high and low parts of the memory address signals;

means for controlling the luminance of the graphic image;

means for generating line synchronising pulses and frame synchronising pulses, for said TV image and means for controlling a graphic unit.

2. A generator as claimed in claim 1 characterised in that the most significant bit in the output of said horizontal counter comprises the line blanking signal for the graphic image.

3. A generator as claimed in claim 1, characterised in that the most significant bit in the output of said vertical counter comprises the frame blanking signal for the graphic image.

4. A generator as claimed in claim 1, characterised in that said means for generating line synchronizing pulses comprises at least one logic gate the output of which is shifted by at least one delay flip-flops.

5. A generator as claimed in claim 1, characterised in that the means for forming test signals generates an output signal for controlling the luminance level of the CRT screen of the TV set.

6. A generator as claimed in claim 1, characterised in that the refresh memory unit comprises a plurality of dynamic random access memory modules.

7. A generator as claimed in claim 1, characterised in that said means for generating frame signals comprises means for generating a frame envelope signal and means for generating half-line pulse signals.

8. A generator as claimed in claim 1, characterised in that the dot clock comprises an oscillator wherein the frequency of the output signal is electronically tunable.

9. A generator as claimed in claim 1, characterised in that it further comprises means for forcing the refresh memory into the writing mode.

10. A generator as claimed in claim 1, characterised in that the refresh memory unit further comprises means for modifying the definition of the graphic image.

* * * * *